United States Patent [19]

Conrad et al.

[11] 4,413,698
[45] Nov. 8, 1983

[54] BATTERY OPERATED HYDRAULIC VEHICLE

[76] Inventors: Walter W. Conrad, 1751 Iris Ave., Torrance, Calif. 90503; James G. Hebert, Jr., 12523 Inglewood Ave., Apt. 14, Hawthorne, Calif. 90250

[21] Appl. No.: 226,942

[22] Filed: Jan. 21, 1981

[51] Int. Cl.³ .............................................. B60K 1/04
[52] U.S. Cl. ................................... 180/305; 180/65 R; 318/139; 320/61
[58] Field of Search ............ 180/307, 308, 305, 65 R, 180/65 A, 65 D, 65 DD, 242, 243, 244, 247, 248, 65.3; 60/325, 420, 431, 444; 74/731, 688, 850; 318/139; 137/625.5, 101; 320/61, 6

[56] References Cited

U.S. PATENT DOCUMENTS

| | | | |
|---|---|---|---|
| 1,291,233 | 1/1919 | Storer | 318/139 |
| 2,820,524 | 1/1958 | Bear | 180/305 X |
| 2,996,135 | 8/1961 | Grabow | 180/307 |
| 3,098,574 | 7/1963 | De Marco | 180/308 X |
| 3,153,908 | 10/1964 | Lawrence | 180/307 X |
| 3,182,742 | 5/1965 | Dow | 180/65 R X |
| 3,367,440 | 2/1968 | Becker | 180/65 A |
| 3,424,260 | 1/1969 | Stone et al. | 180/305 |
| 3,621,929 | 11/1971 | Oberthur | 318/139 X |
| 3,641,416 | 2/1972 | Riff | 320/61 |
| 3,763,415 | 10/1973 | Ownby | 320/61 X |
| 3,948,047 | 4/1976 | Gilbert | 180/305 X |
| 4,042,054 | 8/1977 | Ward | 180/65 R X |
| 4,095,664 | 6/1978 | Bray | 180/65 R |
| 4,214,288 | 7/1980 | Cavil et al. | 318/139 X |
| 4,277,737 | 7/1981 | Müller-Werth | 180/65 R X |
| 4,348,628 | 9/1982 | Loucks | 320/61 |

FOREIGN PATENT DOCUMENTS

| | | | |
|---|---|---|---|
| 2503804 | 8/1975 | Fed. Rep. of Germany | 180/305 |
| 2515694 | 10/1976 | Fed. Rep. of Germany | 180/65.3 |
| 2529451 | 2/1977 | Fed. Rep. of Germany | 180/65.3 |
| 869024 | 5/1961 | United Kingdom | 180/306 |
| 2002884 | 2/1979 | United Kingdom | 180/307 |

*Primary Examiner*—Joseph F. Peters, Jr.
*Assistant Examiner*—Mitchell J. Hill
*Attorney, Agent, or Firm*—Singer & Singer

[57] ABSTRACT

This invention relates to a battery controlled vehicle having a long operating time between battery recharging cycles. The vehicle is hydraulically operated and controlled by means of a variable displacement control and at constant pressure. A battery operated driving motor mechanically drives the hydraulic pumps to maintain the constant pressure while the operator controls the variable displacement valves to control the functions of the vehicle. The life of the battery is extended by means of a hydraulically driven generator that continuously recharges the battery controlling the driving motor. The battery operated motor is always operating at full speed and hence the need for a controller is eliminated, thereby simplifying the electrical controls.

9 Claims, 4 Drawing Figures

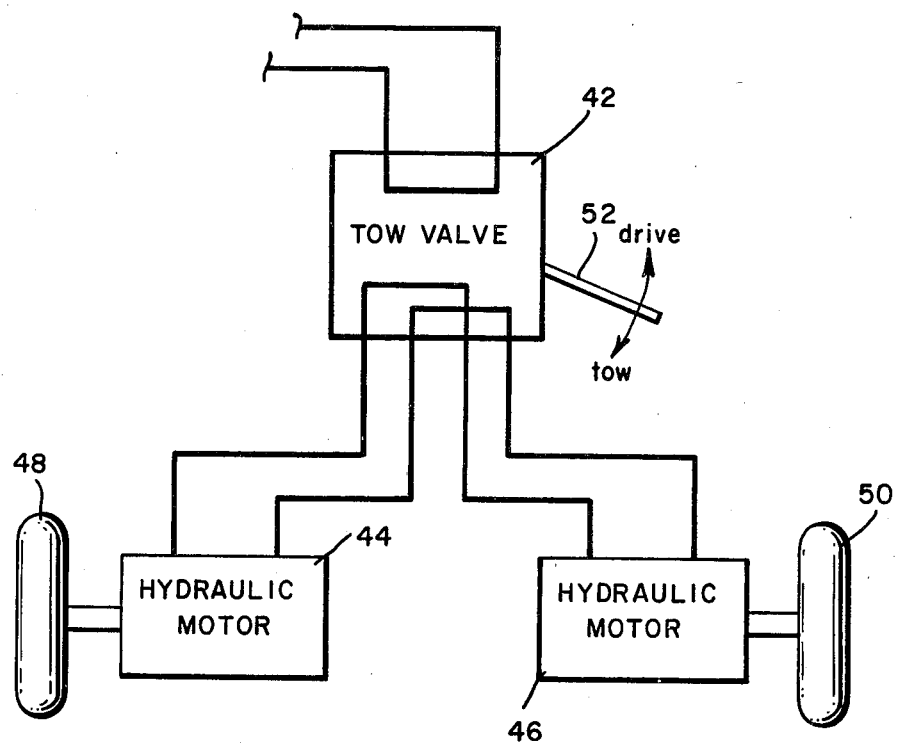
Fig. 2.
Fig. 4.
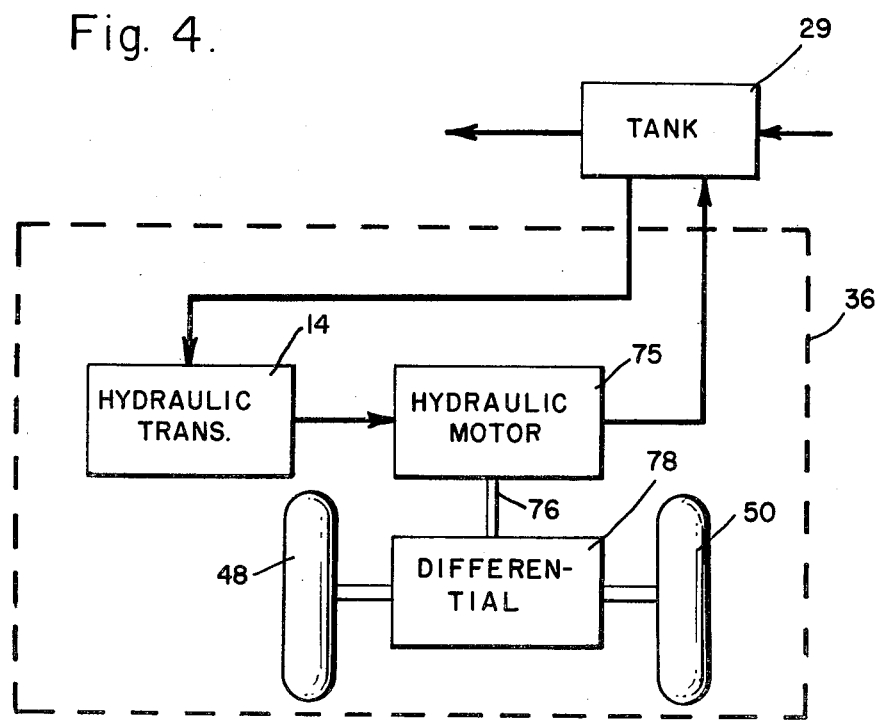

BATTERY OPERATED HYDRAULIC VEHICLE

This invention relates to a battery controlled hydraulically operated vehicle capable of operating for extended times on a single battery charge and more particularly to a hydraulically controlled vehicle which includes a hydraulically driven generator for continuously recharging the source battery thereby obtaining extended usefulness from the battery on a single charge.

The particular vehicle in question is a conventional hydraulically controlled vehicle utilizing a hydraulic pump capable of generating a constant pressure while the functions of the vehicle are controlled by a variable displacement valve. In such a vehicle the drive motor is continuously left in the On position thereby maintaining a constant pressure of hydraulic fluid which then becomes the prime mover for controlling all functions of the vehicle.

Hydraulic vehicles have found wide usefulness in the past for special purpose applications. The main problem with such vehicles is the need that the driving motor, whether it be gas driven or battery operated, must be continuously operating in the full On position in order to obtain the constant hydraulic pressure needed by the hydraulic system. Such vehicles tend to be noisy since the hydraulic fluid must maintain a full head of pressure to control the vehicle and, hence, placing the vehicle in an idle position or in a moving position requires that the motor always stay in the full On and operating position.

At the present time hydraulically controlled vehicles have been adapted to operate with propane gas as a means of conserving oil and gasoline.

A specific application has arisen in and around airports for the need of special purpose vehicles as baggage handlers, towing vehicles and the like, where the requirement for a small useful vehicle having special handling capabilities is desired. The hydraulically operated vehicle has found wide applicability in such applications and in an effort to remove and reduce the emission problem, the gasoline engines and other fossil fueled engines are being removed and replaced with a battery operated DC motor.

The battery operated hydraulically controlled vehicle is in all respects the same as a gasoline operated vehicle with the exception that the driving source comprises a plurality of batteries that must be recharged periodically.

In the art of utilizing battery controlled vehicles the immediate advantage achieved is the elimination of smoke and other pollutants from the atmosphere. Unfortunately, an immediate disadvantage is the limited usefulness of the vehicle that can be obtained from a single charge carried by the on-board batteries.

In the typical battery operated vehicle, whether it is a hydraulically controlled vehicle or a direct voltage controlled vehicle having electric motors on the drive wheels, the expected time between the charging of the on-board batteries would be a function of the use of the vehicle, the time the vehicle is driven and the kind of driving over which the vehicle is used. Recharging of the battery is usually determined by a voltage gauge on the dashboard of the vehicle which indicates when the battery voltage has been depleted to approximately 80% of the rated voltage. This is the point in time that battery manufacturers recommend that the on-board batteries be recharged.

In the prior art various techniques and methods have been used to extend the useful range of the battery operated vehicle before recharging the batteries.

One commonly used technique in the direct drive systems where the drive motors are directly connected to the wheels is to use a controller which is essentially a variable resistance device that selectively controls the voltage applied from the batteries to the drive wheels in sequence and in steps so as to limit the amount of current that the drive wheels draw at any given time. Unfortunately controllers are expensive and bulky and represent a constant maintenance problem because of their need to control the voltage and limit the current.

Another commonly used technique for limiting current drain and hence extend the usefulness of the time between battery charges is to limit the size of the driving motors in an effort to reduce current drain. In this same regard many techniques are disclosed for limiting the speed of the vehicle which has the effect of limiting the current drain and hence extending the time between battery charges.

A so-called brute force method of extending battery life concerns the development of newer and better high capacity batteries which unfortunately are also expensive, thereby reducing any economical advantage of utilizing batteries as the alternate fuel source.

The present invention is concerned primarily with the construction and operation of a battery operated hydraulic vehicle and in which the time between charging requirements of the battery is extended by means of an on-board generator that is positively driven by a hydraulic motor that is connected to the output of a hydraulic pump.

In the operation of a hydraulically controlled vehicle, the electrically operated motor is always operating at full speed in order to generate a constant pressure output for the hydraulic control. The DC drive motor is physically attached and drives a hydraulic transmission and gear pump that is connected in circuit with a source of hydraulic fluid and controllable hydraulic motors. The hydraulic fluid is maintained at a constant pressure and controlling the flow of fluid by means of the variable displacement controls allows the operator of the vehicle to control all necessary functions of the vehicle.

Before the vehicle can be used it is necessary to engage the DC drive motor to thereby drive the hydraulic pump and obtain an output pressure. The motor is therefore started under a no-load condition and it was quickly discovered that a controller of the conventional kind was not needed and that the battery voltage could be applied directly across the terminals of the DC drive motor without harm. This feature immediately reduced the complexity of the vehicle and the cost of the vehicle when it is considered that a controller of the quality required has a cost in excess of $1800 each.

Operation of the vehicle is occasioned through the use of a variable displacement control that varies the fluid through the controlled lines and thereby controls fluid flow to the hydraulic motors connected to the drive wheels or to any accessory units. It should be remembered however that at all times the drive motor is always operating at full speed in order to develop the required constant fluid pressure.

On-board generators or alternators are usually not used or included in battery operated vehicles since conventional analysis would indicate that the losses occasioned by the drive motors and accessory units in recharging the battery must of necessity be supplied by the battery itself and hence conventional analysis would indicate that a bootstrap operation was being attempted and by definition must fail since all power source comes from the on-board battery itself.

In the practice of the present invention, however, it was discovered that connecting a hydraulic motor to the output of a hydraulic drive pump and then driving a DC generator from the hydraulic motor, the output of which was connected in circuit with the battery source, that the life of the on-board battery could be unaccountably extended by continuously recharging the battery during use of the vehicle.

Conventional analysis did not provide for an on-board DC generator since it was very quickly recognized that the on-board battery was the sole source of all power and hence losses in the line between the driving motor and the pump and the hydraulic motor and the DC generator all had to be supplied by the on-board battery and hence losses would simply accumulate, thereby resulting in more battery drain and less time between battery charges.

A comparison between similar battery operated hydraulic systems, one with a recharging generator and one without a recharging generator, produced remarkable results in demonstrating an extended operating time betwween battery recharging times for the vehicle having the on-board generator.

In the present invention a conventional DC drive motor is connected in a driving relationship with a hydraulic source for operating a vehicle. A hydraulic transmission and fluid pump is directly connected to and driven by the drive motor. A pair of hydraulic motors is each separately connected to a drive wheel and fluidly connected to the hydraulic transmission for driving said vehicle either in a forward or reverse direction. A hydraulic motor fluidly connected to said hydraulic pump is mechanically driven to a DC generator and electrically connected to a battery source located on the vehicle for continuously charging the battery source while the vehicle is in operation.

To obtain vehicle operation the battery potential is immediately connected across the motor source and without the need for a controller. This action allows the DC drive motor to operate at full speed and develop a constant hydraulic pressure at the output of the fluid pump. The drive motor is mechanically connected to both a hydraulic pump and a hydraulic transmission arrangement which is actually a variable displacement device which allows the operator to control the amount of fluid being directed to the dirve wheels. This gives the operator a measure of control over the speed of the vehicle with full flow being full speed and no flow placing the vehicle in a stopped condition. The hydraulic motor driving the DC generator will always be operating at full speed whenever the DC drive motor is in the On condition thereby continuously providing a recharging circuit from the DC generator to the batteries.

It will be appreciated, however, that even if the vehicle is not being moved, that the DC drive motor is always on and operating to develop the constant pressure in the hydraulic line and that at all times the DC generator is recharging the battery.

The described system has produced significant advantages in reducing the time between charging the on-board batteries by means of the addition of the DC generator.

Further objects and advantages of the present invention will be made more apparent by referring now to the accompanying drawings wherein:

FIG. 2 illustrates a block diagram of the tow valve illustrated in FIG. 1;

FIG. 4 illustrates a block diagram utilizing a mechanical differential in combination with a hydraulic motor drive.

The present invention is more fully illustrated in connection with FIG. 1 which shows a block diagram for a battery powered vehicle that is hydraulically controlled.

Figure 1:
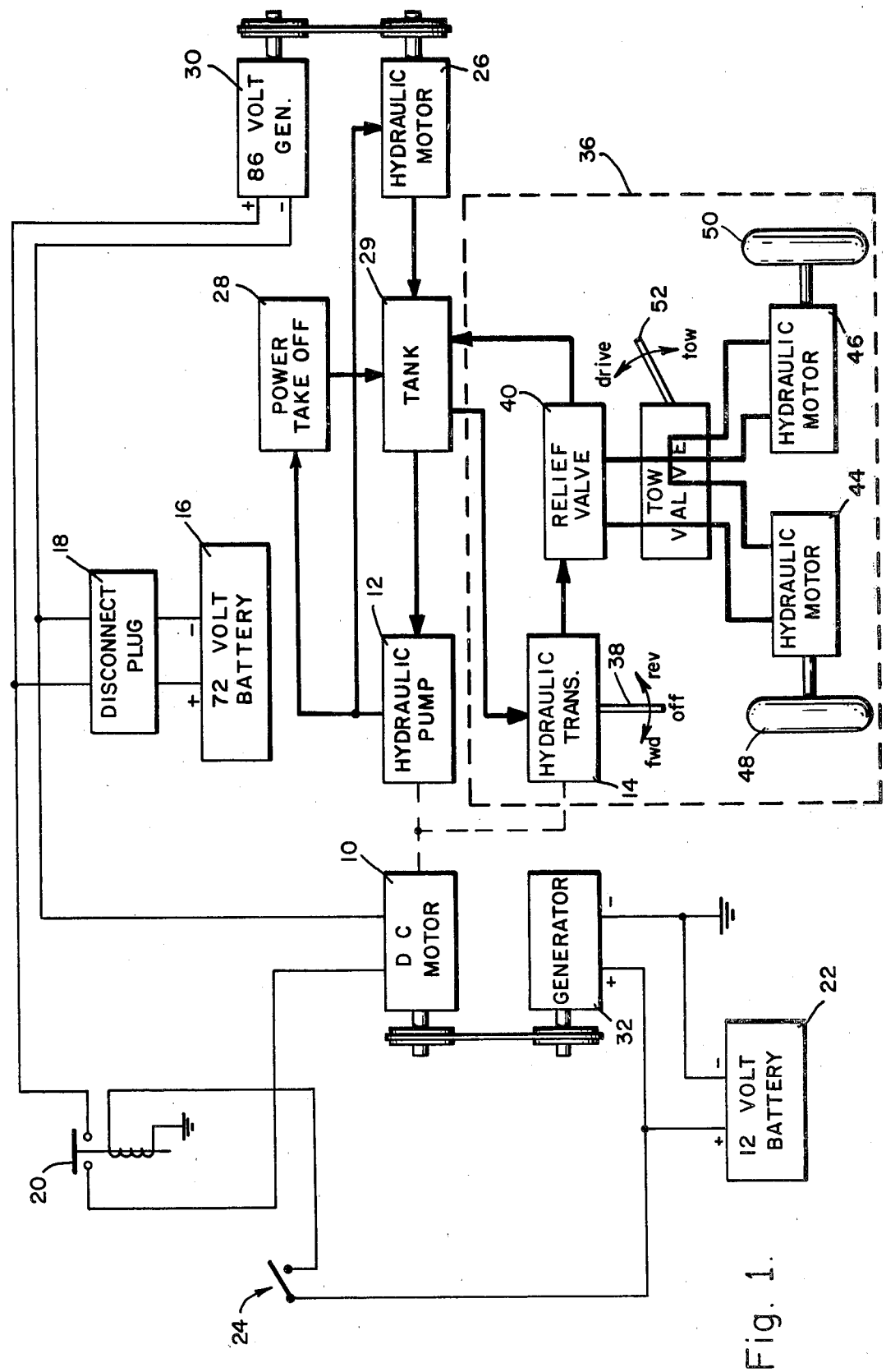
FIG. 1 illustrates a block diagram of a first embodiment illustrating the benefits of this invention.

The problem solved by the embodiment illustrated in FIG. 1 is a battery operated vehicle that has a longer operating time between recharging cycles without sacrificing performance and one that is cheaper to construct by eliminating the need for a controller that limits the current drawn by the main battery source.

The actual vehicle described in connection with the block diagrams of FIGS. 1 and 2 is concerned with a prototype vehicle of the type used in and around commercial airports for performing a variety of functions. The actual vehicle to be described actually contained an endless belt conveying system for use in loading and unloading baggage from commercial jet aircraft.

The vehicle described in connection with FIGS. 1 and 2 comprises a DC motor 10 mechanically coupled to a hydraulic pump 12 and to a controllable hydraulic transmission 14.

In the embodiment being described, the DC motor is actually an 8 h.p. electric traction motor having a no-load speed of approximately 3,500 revolutions per minute and adapted to operate from a 72 volt battery source.

Located on the same chassis is a 72 volt battery source 16 consisting of 12 six volt deep draw batteries. Typical batteries for this kind of installation are manufactured by the Trojan Company and are identified as L-16 deep draw golf cart batteries with the 12 six volt batteries being connected in series to thereby provide an output source of 72 volts. The output of the battery source 16 is connected to a disconnect plug 18 that allows the 72 volt battery source 16 to be conveniently disconnected from the vehicle and removed as a unit if servicing of the battery should be required. The output of the disconnect plug 18 is connected through a conventional solenoid 20 to the operating terminals associated with the DC motor 10.

A conventional 12 volt car battery 22 is located on the vehicle and provides a source of power for operating the relay coil associated with solenoid 20.

A switch 24 is located in series with the coil of the solenoid 20 and across the terminals of battery 22.

In operation the operator simply closes switch 24 which closes solenoid 20 and places the output of the 72 volt battery source 16 across the DC motor 10 allowing the DC motor to operate at full speed. There is no need for a controller or other current limiting device since the DC motor 10 is placed on line immediately and the only load on the motor is the hydraulic system to be described. It will be appreciated, however, that closing the ignition switch 24 and operating the solenoid 20 simply places the DC motor 10 into an operating condition to control the hydraulic equipment directly connected to the DC motor. However, no other function or movement of the vehicle occurs at this time.

The hydraulic pump 12 is driven directly by the DC motor 10 and is hydraulically connected to the hydraulic motor 26. An accessory power takeoff system 28 is also connected to the output of the hydraulic pump 12. A common fluid supply tank 29 is connected in fluid circuit with the motor 26, power takeoff 28 and the hydraulic pump 12.

The system described is basically a constant speed system since the DC motor 10 is on line at all times driving the hydraulic pump 12 at full speed thereby developing a constant head of hydraulic pressure for driving the hydraulic motor 26 and any accessory equipment attached to the accessory power takeoff 28.

The hydraulic motor 26 is belt connected to a conventional 86 volt DC generator 30 which is connected on line across the output of the 72 volt battery source 16 thereby providing a constant trickle charge on the battery source whenever the DC motor 10 is in operation.

In a similar manner a conventional 12 volt generator 32 is belt connected to the output of the DC motor 10 and connected across the 12 volt battery 22 thereby continuously providing a trickle charge for the accessory 12 volt battery whenever the DC motor 10 is in operation.

The hydraulic driving means for moving the vehicle is occasioned by a hydraulic drive 36 that consists of the hydraulic transmission 14 that is mechanically driven by the DC motor 10. The common hydraulic supply tank 29 is fluidly connected to and supplies the hydraulic fluid for the hydraulic transmission 14. The hydraulic transmission 14 used in the present embodiment is actually a Sunstrand hydraulic transmission operating at a constant pressure and having a variable displacement control 38 to control the direction of the flow of fluid and also the amount of fluid flowing from the hydraulic transmission 14. The hydraulic output from the hydraulic transmission 14 is fed to a relief valve 40 which is actually an accumulator and then to a controllable tow valve 42 and then to a pair of hydraulic motors 44 and 46 attached to the driving wheels 48 and 50, respectively.

In normal operation the operator of the vehicle moves lever 38 on the hydraulic transmission 14 into either a forward or reverse direction to control the amount of fluid and the direction of fluid to the relief valve 40. Moving the control 38 in the forward direction a given amount or a greater amount will have the effect of allowing more or less fluid to flow in a given direction whereas moving the control 38 in the reverse direction will reverse the flow of fluid and in an amount determined by the movement of the lever 38.

The tow valve 42 contains a control 52 having a drive position and a tow position that is necessary because of the nature of the hydraulic control lines used to drive the wheels 48 and 50.

The hydraulic motors 44 and 46 will drive the wheels 48 and 50 only when fluid is flowing under pressure and in the absence of fluid flowing under pressure the wheels will not move but on the contrary will be locked in place. The fluid path with the control 52 in the drive position will allow the driving fluid to circulate from hydraulic motor 44 into hydraulic motor 46 and back through the tow valve 42 through the relief valve 40 and back through and into the hydraulic transmission 14. Placing the control 38 of the hydraulic transmission in the center or off position prevents any fluid flowing from the hydraulic transmission and in this fashion the wheels 48 and 50 are in a locked or nonmoving position. Any attempt to move the vehicle by external means will be resisted since the fluid cannot be forced through the hydraulic transmission and the vehicle is effectively locked in place. This feature unfortunately has a disadvantage in the event there is a malfunction of the equipment and the vehicle must be towed or moved by external means.

Referring now to FIG. 2, there is shown a tow valve 42 with the control 52 in the tow position. The hydraulic lines from the hydraulic motor 44 and 46 are now channeled away from the lines emanating from the hydraulic transmission 14 and are connected in series between hydraulic motor 44 and hydraulic motor 46 thereby allowing the vehicle to be towed which now results in driving wheels 48 and 50 simply recycling the hydraulic fluid through the tow valve which has the effect of allowing the vehicle to be pushed or moved by external means.

Referring again to FIG. 1, it will be appreciated that the vehicle is first operated by closing ignition switch 24 which closes solenoid 20 and places the output of the 72 volt battery source 16 across the DC motor 10. This action causes the DC motor 10 to operate at full speed, building up a head of pressure in the hydraulic pump 12 and the hydraulic transmission 14. At this point in time hydraulic motor 26 is operating at full speed and the output from the 86 volt generator 30 continually recharges the 72 volt battery source 16. In a similar fashion the output of the 12 volt generator 32 continually recharges the 12 volt battery 22 which is used for incidental purposes as previously described.

In the embodiment being described, the 86 volt generator 30 is adapted to operate at 2000 rpm at which point it delivers an actual voltage of 85.6 volts and at 52 amperes. The belt drive mechanism allows the proper speeds to be selected by careful selection of the proper diameter pulleys. Since the DC motor 10 is always operating at full speed, the output of the 86 volt generator 30 and the output of the 12 volt generator 32 can be accurately controlled and adjusted to trickle charge the 72 volt battery source 16 and the 12 volt battery 22, respectively.

Movement of the vehicle is occasioned by the operator moving the control 38 associated with the hydraulic transmission 14 either in a forward or reverse direction.

Steering of the vehicle is conventional and brakes may or may not be needed in view of the dynamic braking associated with the hydraulic system as peviously described. Moving the vehicle and turning the vehicle around corners does result in an accumulation of fluid as a result of one hydraulic motor 44 turning faster than another hydraulic motor such as 46. In this situation an accumulation of fluid results whenever one motor goes faster than the other. With the vehicle moving in a straight line, both hydraulic motors 44 and 46 rotate at the same speed, however, it will be appreciated that turning either left or right may cause hydraulic motor 44 or 46 to be operated at different speeds and hence the need for the relief valve 40.

The accessory power takeoff 28 is a conventional hydraulic takeoff and may be used to control any external operating device required by the user.

Battery manufacturers recommend that batteries be recharged whenever operating voltage drops to 80% of rated value.

The user of the electric vehicle is primarily concerned with utilizing his vehicle for a maximum period of time between recharging cycles.

Actual tests on the vehicle just described and in which the accessory power takeoff 28 was connected to an endless belt have shown that the vehicle without the 86 volt generator 30 and in an operating condition having a load on the accessory power takeoff 28 drew 55 amperes from the 72 volt battery source 16.

The same machine, but now including an 86 volt generator 30 connected as shown in connection with FIG. 1 and containing the same load on the accessory power takeoff 28, now showed a current draw of 65 amperes from the 72 volt battery source 16 but at the same time indicated a current of 50 amperes from the 86 volt generator 30 being used to recharge the 72 volt battery source 16.

In other words, it would appear that utilizing the 86 volt generator 30 now allowed the same vehicle to do the same work with a net current drain of 15 amperes.

The vehicle without the 86 volt generator 30 and having a 72 volt battery source 16 as previously described is capable of being operated for a total of 4 hours and 30 minutes before the voltage of the 72 volt battery source 16 drops to 80% of value.

The unexpected benefits derived from utilizing the 86 volt generator 30 on the same vehicle now allows the same vehicle to be operated with the same 72 volt battery source 16 for a total of almost 12 hours before the 72 volt battery source 16 drops to 80% of value and must be recharged.

The benefits to be derived from the present invention can be extended by utilizing batteries having improved capabilities other than the Trojan L-16 deep draw batteries described above. For example, there are available industrial batteries having 425 ampere hour capacities that extend the recharging time to six hours before battery voltage drops to 80% of value. By way of comparison the industrial batteries just described have a cost of approximately $4,300.00, whereas the Trojan batteries used in the preferred embodiment have a cost of only $1,100.00. The advantages of getting six hours between recharging cycles as opposed to four and a half hours recharging cycles may or may not justify the increased cost of the industrial batteries, however, utilizing the industrial batteries in the invention as described in FIG. 1 now give a projected time between recharging cycles of 18 hours as opposed to 12 hours using the Trojan batteries.

In any event, the effect of utilizing the 86 volt generator 30 as illustrated in FIG. 1 will be apparent and provide increased battery time between recharging rates regardless of the batteries used.

Figure 3:
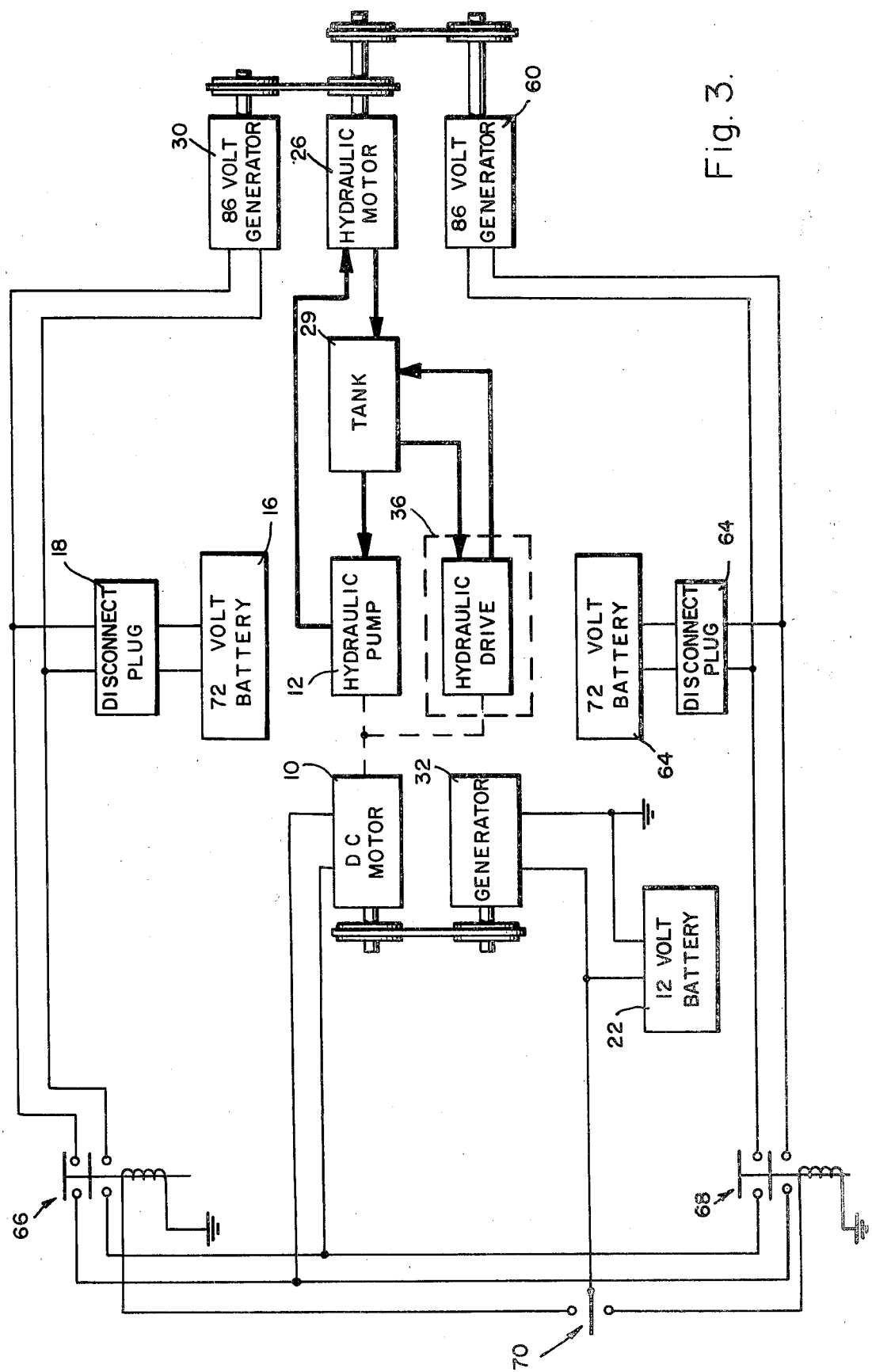
FIG. 3 illustrates a block diagram of a second embodiment of a battery powered hydraulically operated vehicle.

Referring now to FIG. 3, there is shown a second embodiment of an electric drive car vehicle utilizing the same principle as described in connection with FIG. 1 and which projections show should have a highway speed of 60 miles per hour and a time between recharging of approximately 12 hours.

The over-the-road vehicle will utilize a Volkswagen chassis and in which the wheels are driven by a pair of hydraulic motors as described in connection with FIG. 1.

Due to the weight of the batteries the Volkswagen chassis will be converted to a two passenger vehicle with the rear portion being devoted to holding the battery compartment needed to drive the vehicle. The front portion of the VW sedan will contain the DC motor and the generators for charging the batteries. Placing the DC motor and the generators in the forward portion of the car and the battery portion in the rear portion of the car should provide the necessary stability and balancing of weight for the vehicle.

In describing the embodiment illustrated in FIG. 3, similar numbers will be used for similar devices previously described in FIG. 1. By way of an overview it will be immediately appreciated that the system of FIG. 3 is the same as that described in connection with FIG. 1 with the addition of a second 72 volt battery source and a second 86 volt generator.

Referring now to FIG. 3, there is shown a DC motor 10 mechanically coupled to a hydraulic pump 12 and a hydraulic drive 36 used to control the movement of the vehicle.

The output of the hydraulic pump 12 is hydraulically connected to a hydraulic motor 26 that is belt connected to a first 86 volt generator 30 and a second 86 volt generator 60. The output of the 86 volt generator 30 is connected through a disconnect plug 18 to a 72 volt battery source 16 and similarly the output of the 86 volt generator 60 is connected through a disconnect plug 62 to a second 72 volt battery source 64.

The DC motor 10 is belt connected to a 12 volt generator 32 used to trickle charge a 12 volt battery 22 that is used to control accessory items of the vehicle such as horns, car and ignition.

A first solenoid 66 is selectively controlled to place the output of the 72 volt battery source 16 across the DC motor 10. In a similar fashion a second solenoid 68 is selectively controlled to place the output of the 72 volt battery source 64 across the output of the DC motor 10.

A two position ignition switch 70 operating from the 12 volt battery source 22 is adapted to select either solenoid 66 or solenoid 68 in placing battery source 16 or battery source 64 across the DC motor 10.

In operation the user operates the switch 70 and selects a single battery source to operate the DC motor 10. If solenoid 66 is selected, then the battery potential from the 72 volt battery source 16 is placed across the DC motor 10 directly and the DC motor immediately operates at full speed and generates full hydraulic pressure at the output of the hydraulic pump 12 and the hydraulic drive 36. Hydraulic motor 26 is immediately operated at full speed and drives the 86 volt generator 30 and the 86 volt generator 60 at full rated speed which in this embodiment is 2000 revolutions per minute to immediately charge the 72 volt battery source 16 and the 72 volt battery source 64.

With the 72 volt battery source 16 being used to drive the DC motor 10, the 86 volt generator 60 simply maintains a trickle charge on the unused battery source 64.

The extended use of each of the battery sources 16 and 64 is now obtainable by means of the individual 86 volt generators 30 and 60 thereby allowing the vehicle application to obtain the benefits of the invention in getting extended battery use before the need for recharging the batteries.

The cost specification as described in connection with FIG. 3 will include the following:

A Volkswagen floor pan
A Volkswagen front axle
Carmen Ghia front disc brakes
Volkswagen square back rear brakes
One Balder electric motor, part #7544D One Sunstrand transmission, part #18-2035

Two cross gear motors, 50 series, for the drive rails, part #50MO38

Two cross gear motors, 40 series, for running the generators, part #40M005

Two PMI MC Series Motors for driving the generators, part #MC27P

One Delta electric control valve, part #85005018

One Sperry Victor's flow control valve, part #FCG-02

Two Tempo Instrument DC regulators for the 72 volt batteries

One Delco Remey Generator, 60 amp, for the 12 volt batteries

Two GMC Control relays, part #M6400

Two sets Trojan batteries of 36 volt 2 volt batteries, M-205

One Trojan battery, (12 volt system), XH-22FC

Two front rims, 14×7 diameter

Two rear rims, 15×8½ diameter

Two front tires, B. F. Goodrich, P245/50-14

Two rear tires, B. F. Goodrich, P295/50-15

One Delta Gear Pump, Part #A4

One relief valve, Gresen Double Crossover, DWV-75-3000

One tow valve, Worcester Ball Valve, Part #3/4 SE MAXIMISER

One hydraulic tank, Part #456000131

The specifications on the two 86 volt generators, part numbers 30 and 60, are that they turn at 2000 RPM and produce 86 volts and 52 amperes continuously.

The Balder motor drive, part number DC motor 10 draws 65 to 67 amps while turning the Sunstrand transmission, hydraulic drive 36, the Delta hydraulic pump 12, and the DC generator motor 10.

The Balder DC motor 10 draws 125 to 130 amperes at speeds between 55 and 60 miles an hour.

The circumference of the rear wheels is 86 inches or approximately 7 feet. The wheel motors turn at 980 rpm at full throttle, thereby giving the car a top speed of over 80 miles per hour while drawing 195 to 205 amperes. Utilizing the two 86 volt generators 30 and 60 allow the car to be driven at 55 mph with a net ampere loss of 21 to 26 amperes.

Keeping the 72 volt battery 16 and 64 charged 80% or better, will allow the car to operate for over 6 hours of normal driving or in excess of 300 miles on each battery.

Referring now to FIG. 4, there is shown a modified hydraulic drive 36 that could be used in the embodiment illustrated in connection with FIG. 1 or FIG. 3.

The hydraulic drive 36 is comprised of a hydraulic transmission 14 that is hydraulically connected to tank 29 in a similar fashion as described in connection with FIG. 1. The output of hydraulic transmission 14 is fluidly connected to a hydraulic motor 75 having a shaft 76 that drives a conventional differential 78. The output of the differential 78 is connected to the driving wheels 48 and 50.

The embodiment described in connection with FIG. 4 allows a conventional driving train to be used with the output of the hydraulic motor 75 as the driving means for driving the vehicle. In this fashion the driving wheels 48 and 50 can easily turn corners with one wheel going faster than the other and utilizing the planetary gears in the differential 78 as the means for allowing one wheel to turn faster than the other as when going around corners. In this fashion the relief valve 40 illustrated in connection with FIG. 1 can be eliminated and the principles of the invention can be achieved in the same fashion as described in connection with FIGS. 1, 2 and 3.

We claim:

1. A battery operated hydraulic vehicle comprising:
   a DC drive motor adapted to drive a hydraulic for operating a vehicle,
   a battery source adapted to be directly connected across said DC motor at full battery DC potential for operating said motor at full speed at all times,
   a hydraulic transmission and hydraulic pump directly connected to and driven by said drive motor,
   at least one hydraulic motor connected to said hydraulic transmission for driving said vehicle either in a forward or reverse direction,
   an auxiliary hydraulic motor fluidly connected to said hydraulic pump, and
   a charging device mechanically driven by said auxiliary hydraulic motor and electrically connected to said battery source for continuously charging said battery source during the use of the vehicle.

2. A vehicle according to claim 1 in which said DC drive motor is adapted to run on 72 volts and in which said battery source includes 12 6-volt batteries connected in series to thereby form a total of 72 volts.

3. A vehicle according to claim 1 which includes a common source of hydraulic fluid for all hydraulic functions of said vehicle.

4. A vehicle according to claim 1 which includes a pair of hydraulic motors each separately connected to a drive wheel and fluidly connected to said hydraulic transmission for driving said vehicle either in a forward or reverse direction.

5. A vehicle according to claim 4 which includes a hydraulic cross over relief valve in the output line from said hydraulic transmission line thereby allowing each of said pair of hydraulic motors to operate at different speeds as said vehicle travels in an arcuate path.

6. A vehicle according to claim 1 which includes a charging device mechanically driven by said DC motor and electrically connected to a separate low voltage battery for continuously charging said separate battery and in which said battery supplies power for accessory items including lights, horn and ignition control.

7. A vehicle according to claim 1 which includes a selectable second battery source adapted to be directly connected across a DC motor at full battery DC potential for operating said motor at full speed at all times, and a second DC generator mechanically driven by said hydraulic motor and electrically connected to said second battery source for continuously charging said battery source.

8. A vehicle according to claim 7 which includes a first solenoid for selectively placing the output of said first battery source across said motor and a second solenoid for selectively placing the output of said second battery source across said motor and
   a controllable ignition switch for selecting either said first solenoid or said second solenoid.

9. A battery operated hydraulic vehicle comprising:
   a DC drive motor adapted to drive a hydraulic for operating a vehicle,
   a battery source adapted to be directly connected across said DC motor at full battery DC potential for operating said motor at full speed at all times,
   a hydraulic transmission and hydraulic pump directly connected to and driven by said drive motor, a pair of hydraulic motors each separately connected to a drive wheel and fluidly connected to said hydraulic transmission for driving said vehicle either in a forward or reverse direction, a manually controlled hydraulic tow valve in the output line feeding said pair of hydraulic motors for disconnecting the output line from said hydraulic transmission and connecting the hydraulic motor lines together thereby allowing said vehicle to be towed, an auxiliary hydraulic motor fluidly connected to said hydraulic pump, and a charging device mechanically driven by said auxiliary hydraulic motor and electrically connected to said battery source during the use of the vehicle for continuously charging said battery source.

* * * * *